(12) United States Patent
Solodovnik et al.

(10) Patent No.: US 11,608,186 B2
(45) Date of Patent: Mar. 21, 2023

(54) IMPEDANCE BALANCING FOR NOISE FILTERING IN ELECTRIC DRIVE SYSTEMS

(71) Applicant: The Boeing Company, Chicago, IL (US)

(72) Inventors: Eugene V. Solodovnik, Kenmore, WA (US); Kamiar J. Karimi, Kirkland, WA (US); Shengyi Liu, Sammamish, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/450,045

(22) Filed: Oct. 5, 2021

(65) Prior Publication Data

US 2022/0212808 A1 Jul. 7, 2022

Related U.S. Application Data

(60) Provisional application No. 63/133,987, filed on Jan. 5, 2021.

(51) Int. Cl.
*B64D 27/24* (2006.01)
*H02M 5/458* (2006.01)
(Continued)

(52) U.S. Cl.
CPC ............ *B64D 27/24* (2013.01); *H02M 5/458* (2013.01); *H02M 7/493* (2013.01); *H02P 27/06* (2013.01);
(Continued)

(58) Field of Classification Search
None
See application file for complete search history.

(56) References Cited

U.S. PATENT DOCUMENTS

| | | | |
|---|---|---|---|
| 2013/0235628 A1* | 9/2013 | Dong | H02M 7/797 363/47 |
| 2014/0252946 A1* | 9/2014 | Fujita | H02M 1/44 315/51 |
| 2015/0354539 A1* | 12/2015 | Goessling | H02K 7/183 363/16 |

OTHER PUBLICATIONS

Shoyama, M. et al., "Balanced Switching Converter to Reduce Common-Mode Conducted Noise," IEEE Transactions on Industrial Electronics, vol. 50, No. 6, Dec. 2003, 5 pages.
(Continued)

*Primary Examiner* — Jared Fureman
*Assistant Examiner* — Aqeel H Bukhari
(74) *Attorney, Agent, or Firm* — Alleman Hall Creasman & Tuttle LLP

(57) ABSTRACT

An electric drive system including an impedance balancing noise filtering circuit is disclosed. The electric drive system includes a direct current (DC) power source configured to output DC power to an output port and an inverter configured to convert the DC power output by the DC power source into alternating current (AC) power that is provided to an input port of an AC load. The impedance balancing noise filtering circuit includes an impedance bridge electrically intermediate the output port of the DC power source and the input port of the AC load. The impedance balancing noise filtering circuit includes different sets of passive components that are positioned on both the DC-side and the AC-side of the inverter. These sets of passive components are configured to facilitate impedance balancing that reduces common-mode (CM) electromagnetic interference (EMI) emission at the output port of the DC power source.

20 Claims, 5 Drawing Sheets

(51) Int. Cl.
*H02M 7/493* (2007.01)
*H02P 27/06* (2006.01)
(52) U.S. Cl.
CPC ....... *B64D 2221/00* (2013.01); *H02J 2310/44* (2020.01)

(56) References Cited

OTHER PUBLICATIONS

Wang, S. et al., "Common Mode Noise Reduction for Boost Converters Using General Balance Technique," IEEE Transactions on Power Electronics, vol. 22, No. 4, Jul. 2007, 7 pages.
Xing, L. et al., "Conducted Common-Mode EMI Reduction by Impedance Balancing," IEEE Transactions on Power Electronics, vol. 27, No. 3, Mar. 2012, 6 pages.

* cited by examiner

IMPEDANCE BALANCING FOR NOISE FILTERING IN ELECTRIC DRIVE SYSTEMS

CROSS REFERENCE TO RELATED APPLICATIONS

This application claims priority to U.S. Patent Application Ser. No. 63/133,987, filed Jan. 5, 2021, the entirety of which is hereby incorporated herein by reference for all purposes.

FIELD

This invention relates generally to electric drive systems, and more specifically, to using impedance balancing techniques to filter common mode electromagnetic interference (EMI) noise in electric drive systems.

BACKGROUND

An electric drive system implemented using an electronic power converter may have parasitic characteristics that generate high frequency noise and harmonics resulting in electromagnetic interference (EMI). Such EMI negatively influences both a load (e.g., a motor) that is driven by the electric drive system and a power source (e.g., a DC bus) that outputs power to the electric drive system. Common mode noise is one type of EMI that conducts through a ground current path of an electric drive system. Such common mode noise may be complex and difficult to model for purposes of noise filtering.

SUMMARY

To address the above issues, according to one aspect of the present disclosure, an electric drive system including an impedance balancing noise filtering circuit is provided. The electric drive system includes a direct current (DC) power source configured to output DC power to an output port, an inverter configured to convert the DC power output by the DC power source into alternating current (AC) power that is provided to an input port of an AC load. The impedance balancing noise filtering circuit includes an impedance bridge electrically intermediate the output port of the DC power source and the input port of the AC load. The impedance balancing noise filtering circuit further includes different sets of passive components that are positioned on both the DC-side and the AC-side of the inverter. These sets of passive components are configured to facilitate impedance balancing that reduce common-mode (CM) electromagnetic interference (EMI) emission at the output port of the DC power source.

The features and functions that have been discussed can be achieved independently in various embodiments or may be combined in yet other embodiments, further details of which can be seen with reference to the following description and drawings.

DETAILED DESCRIPTION

Figure 1:
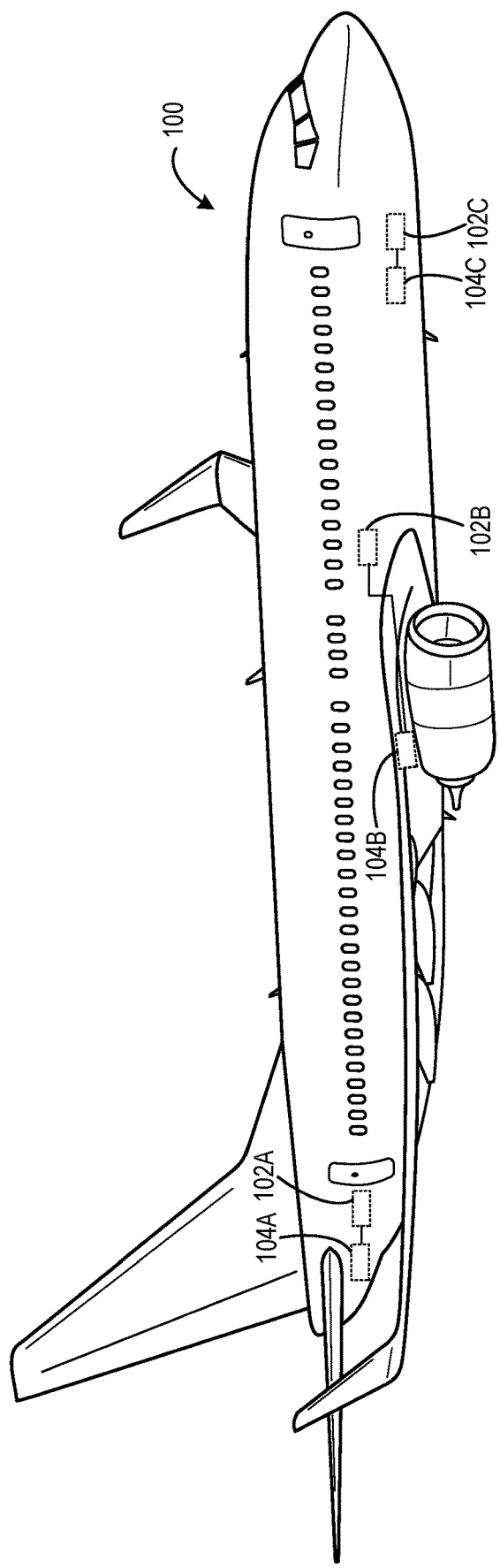
FIG. 1 schematically shows an example embodiment of an aircraft that includes various electric drive systems.

Electric drive systems may be implemented in numerous applications, such as vehicle applications including automobile, watercraft, and aircraft applications. For aircraft applications, electric drive systems may be employed throughout an aircraft to drive different types of loads. FIG. 1 schematically shows an example embodiment of an aircraft 100 including a plurality of electric drive systems 102 configured to drive a corresponding plurality of loads 104. As one example, an electric drive system 102A is configured to start an auxiliary power unit (APU) 104A that is used to start main engines of the aircraft 100. The electric drive system 102A may be configured to modulate electrical power received from a power source to a form that is suitable to start the APU 104A. As another example, an electric drive system 102B is configured to drive an electric motor 104B that is configured to drive a hydraulic pump for a hydraulic actuation system of the aircraft 100. As yet another example, an electric drive system 102C is configured to drive an electric motor 104C that is configured to actuate an air compressor for pressurizing an interior cabin of the aircraft 100.

The above described electric drive systems and corresponding loads are provided as non-limiting examples of electric drive systems that generate high frequency noise and harmonics resulting in electromagnetic interference (EMI) including common mode noise. While electric drive systems are primarily described herein with reference to aircraft applications, this is in no way limiting. The disclosed electric drive systems may be used in any other application, including non-aircraft vehicle applications and non-vehicle applications.

In general, the present description is directed to an electric drive system including an impedance balancing noise filtering circuit configured to filter common mode noise. The electric drive system includes a DC power source configured to output DC power and an inverter configured to convert the DC power into AC power. The impedance balancing noise filtering circuit is configured to filter common mode noise that is conducted through a ground path that negatively impacts both the load side and the source side (e.g., via noise pollution) of the electric drive system. By filtering the common mode noise in this manner, filtered AC power may be provided to drive an AC load. The impedance balancing noise filtering circuit includes an impedance bridge formed around the inverter. The impedance balancing noise filtering circuit further includes passive components (e.g., inductors, capacitors, resistors) positioned on both the DC-side and the AC-side of the inverter. The impedance bridge in conjunction with the passive components are configured to create an impedance match. In particular, the impedance bridge and the passive components are configured to effectively create a common mode current having a same amplitude and an opposite phase that cancels with a common mode current to be filtered from the electric drive system.

The electric drive system including the impedance balancing noise filtering circuit may provide various advantages. For example, EMI filters are commonly positioned at both input and output sides of a conventional electric drive system to create an impedance mismatch in the EMI current path of the electric drive system to reduce common mode noise. However, such EMI filters are typically large and heavy. The passive components of the impedance balancing noise filtering circuit are significantly smaller and more efficient than conventional EMI filters. In other words, by employing the impedance balancing noise filtering circuit in place of conventional EMI filters, significant reductions in weight, volume, and power loss are realized for the electric drive system that, in turn, increases performance of the electric drive system in terms of specific power and efficiency.

Figure 2:
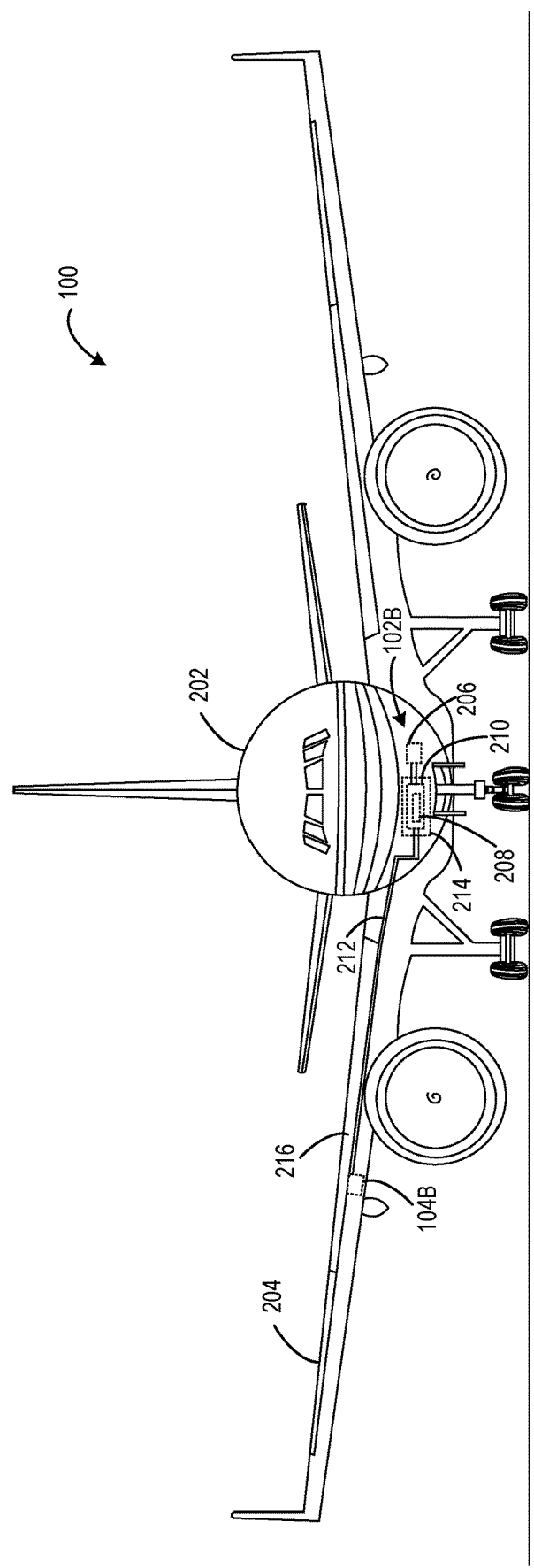
FIG. 2 is a front view of the aircraft of FIG. 1 schematically showing an example electric drive system including an impedance balancing noise filtering circuit configured to output filtered AC power to an AC motor.

Using the aircraft 100 of FIG. 1 as an example, an electric drive system including an impedance balancing noise filtering circuit may provide various advantages. FIG. 2 schematically shows a front view of aircraft 100 from FIG. 1. The aircraft 100 includes a fuselage 202 and a wing 204 extending from the fuselage 202. The aircraft 100 includes the electric drive system 102B. The electric drive system 102B includes a DC power source in the form of a DC bus 206 that is positioned in the fuselage 202. The DC bus 206 is configured to output DC power to an inverter 208. The inverter 208 is configured to convert the DC power to AC power. An impedance balancing noise filtering circuit 210 is configured to filter common mode noise that is conducted through a ground path of the electric drive system 102B, such that common mode noise EMI is reduced on both the source side and the load side of the electric drive system 102B. As such, filtered AC power having reduced noise may be provided to a power cable 212. The inverter 208 and the impedance balancing noise filtering circuit 210 are contained in a shared/common enclosure 214 that is positioned in the fuselage 202 of the aircraft 100. The common enclosure 214 is configured to provide radiated EMI shielding for the inverter 208 and the impedance balancing noise filtering circuit 210. The power cable 212 extends from the common enclosure 214 in the fuselage 202 to the electric motor 104B in the wing 204. The electric motor 104B is an AC motor configured to drive a hydraulic pump of the hydraulic actuation system 216 on the wing 204. The power cable 212 is configured to transmit the filtered AC power a significant distance from the common enclosure 214 in the fuselage 202 to the electric motor 104B in the wing 204. Since the impedance balancing noise filtering circuit 210 filters common mode noise, the electric motor 104B may be provided with filtered AC power having reduced EMI noise.

The above described electric drive system including the impedance balancing noise filtering circuit is provided as a non-limiting example. The impedance balancing noise filtering concepts discussed herein are broadly applicable to other electric drive systems that drive other loads on an aircraft as well as electric drive systems implemented in other applications.

Figure 3:
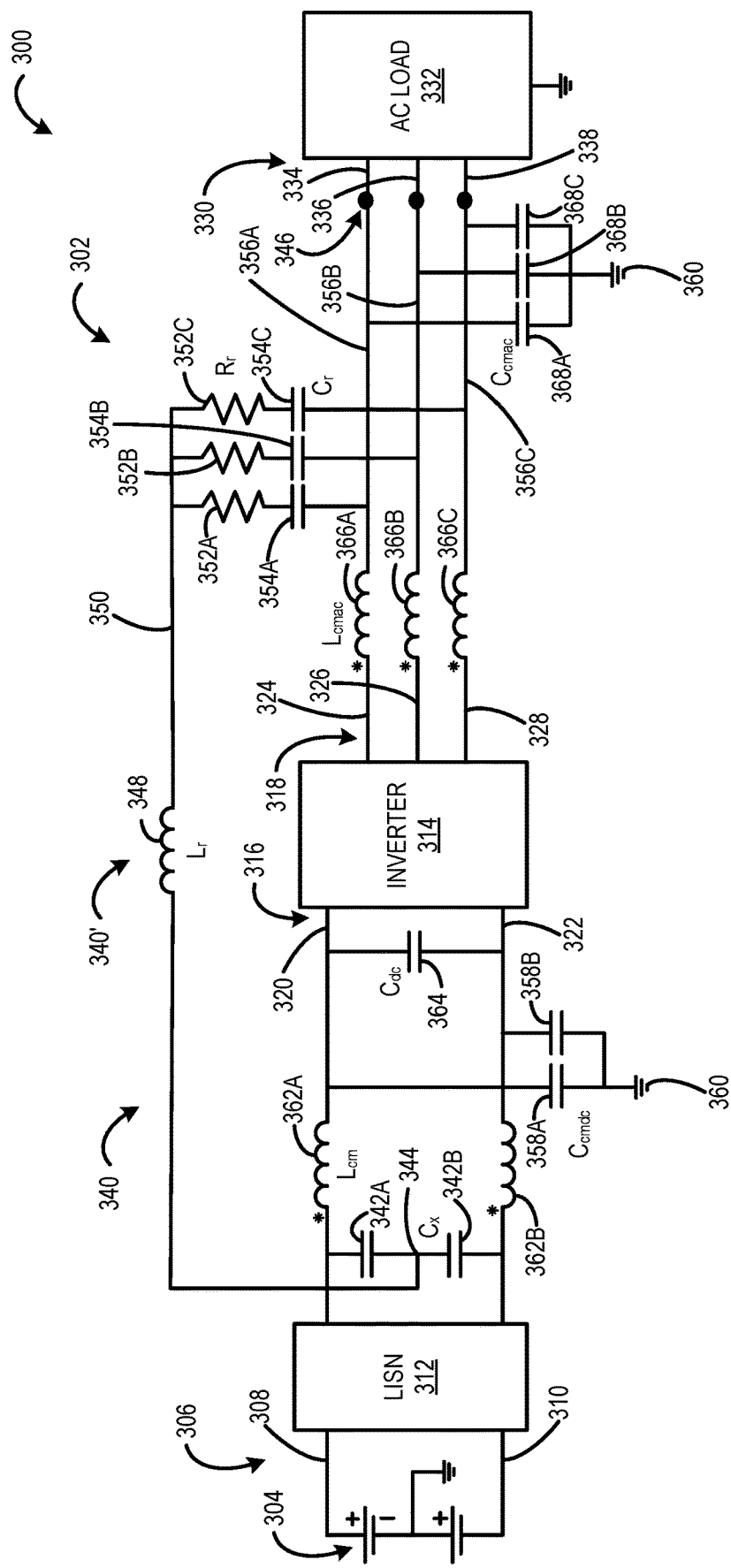
FIG. 3 schematically shows an example electric drive system including an impedance balancing noise filtering circuit.

FIG. 3 is a circuit diagram showing an example embodiment of an electric drive system 300 including an impedance balancing noise filtering circuit 302. For example, the electric drive system 300 may be representative of the electric drive system 102B shown in FIG. 2. The electric drive system 300 includes a DC power source 304 configured to output DC power to an output port 306 including a positive output terminal 308 and a negative output terminal 310. The DC power source 304 may take any suitable form. Returning to the above described airplane example, the DC power source 304 may include a DC power bus, a battery, and/or another suitable power source.

A line impedance stabilization network 312 (LISN) is shown connected to the output port 306 of the DC power source 304. The LISN 312 is configured to provide a precise impedance to the output port 306 of the DC power source 304 in order to get repeatable measurements of EMI noise present at the LISN 312. The LISN 312 may be used to predict conducted emission for diagnostic and compliance testing of the electric drive system 300. The LISN 312 optionally may be omitted from the electric drive system 300.

The electric drive system 300 further includes an inverter 314 including an input port 316 and an output port 318. The input port 316 includes a positive input terminal 320 and a negative input terminal 322. The output port 318 includes a first output terminal 324, a second output terminal 326, and a third output terminal 328. The inverter 314 is configured to convert DC power output by the DC power source 304 into AC power. The inverter 314 may take any suitable form. In one example, the inverter 314 has a six-switch topology.

The inverter 314 is configured to provide the AC power to an input port 330 of an AC load 332. The input port 330 includes a first input terminal 334, a second input terminal 336, and a third input terminal 338. The input port 330 of the AC load 332 may be referred to as an output port 346 of the impedance balancing noise filtering circuit 302 as these ports are opposite sides of the same reference point in the circuit. The AC load 332 may take any suitable form. In one example, the AC load 332 includes a three-phase AC motor. The three-phase AC motor may be connected to the input port 330 via a power cable (e.g., the power cable 212 shown in FIG. 2). In some examples, the AC motor may be an induction motor or a synchronous machine. In other examples, the electric drive system 300 may be configured to drive another type of AC load.

There are several paths within the electric drive system 300 for ground current to create common mode EMI noise. As one example, common mode noise may be generated via packaging of semiconductor power devices (e.g., of the inverter 314) that are mounted on a grounded heatsink. As such devices switch, terminal voltages relative to ground change, which induces a high-frequency current through the capacitive interface to the heatsink. The induced ground current seeks a path to return to the device terminals and at least some of the induced ground current returns through the DC power source 304 and contributes to the common mode EMI emission (e.g., as measurable by the LISN 312). As another example, a ground current path may flow through the AC motor. In particular, the current path may be formed by capacitive coupling between stator windings and a grounded motor frame. As another example, DC bus bars of the DC power source 304 also may become capacitively coupled to the heatsink and other supporting structures, and the resulting grounding capacitance may contribute to common mode EMI emission. Such parasitic capacitance can be combined with parasitic grounding capacitance of the power semiconductor devices discussed earlier, as well as any external common mode capacitors between the bus bars of the DC power source 304 and ground. The total common mode EMI emission of the electric drive system 300 may be modeled as a common mode device parasitic impedance of the inverter 314 and a common mode impedance of the AC load 332.

The impedance balancing noise filtering circuit 302 is configured to balance the common mode device parasitic impedance of the inverter 314 and the common mode impedance of the AC load 332. In particular, the impedance balancing noise filtering circuit 302 is configured to introduce a common mode balancing current at the output port 306 of the DC power source 304. The common mode balancing current has a substantially matching amplitude, but opposite polarity, of a common mode current generated by the parasitic impedances at the output port 306 of the DC power source 304.

The impedance balancing noise filtering circuit 302 includes an impedance bridge 340 electrically intermediate the output port 306 of the DC power source 304 and the input port 330 of the AC load 332. In the illustrated example, the impedance bridge 340 includes a Wheatstone impedance bridge 340'. In other implementations, other impedance bridge configurations may be employed.

The Wheatstone impedance bridge 340' includes a first DC-side bridge capacitor 342A electrically intermediate the positive output terminal 308 of the DC power source 304 and a DC-side bridge connection node 344. A second DC-side bridge capacitor 342B is electrically intermediate the negative output terminal 310 of the DC power source 304 and the DC-side bridge connection node 344. The first DC-side bridge capacitor 342A, the DC-side bridge connection node 344, and the second DC-side bridge capacitor 342B are in series between the positive output terminal 308 and the negative output terminal 310 of the DC power source 304. The first and second DC-side bridge capacitors 342A, 342B have a capacitance ($C_x$). The first and second DC-side bridge capacitors 342A, 342B provide a common mode connection point for the Wheatstone impedance bridge 340' across the positive and negative output terminals 308, 310 of the DC power source 304 on the DC side of the inverter 314.

A bridge inductor 348 is electrically intermediate the DC-side bridge connection node 344 and an intermediate bridge node 350. The bridge inductor 348 is configured to introduce a common mode current at the output port 306 of the DC power source 304. The bridge inductor 348 has an inductance ($L_r$) that is selected such that the Wheatstone impedance bridge balances impedance that, in turn, results in a cancellation of the common mode current of the electric drive system 300.

A first AC-side bridge resistor 352A is in series with a first AC-side bridge capacitor 354A between the intermediate bridge node 350 and a first AC-side bridge connection node 356A. A second AC-side bridge resistor 352B is in series with a second AC-side bridge capacitor 354B between the intermediate bridge node 350 and a second AC-side bridge connection node 356B. A third AC-side bridge resistor 352C is in series with a third AC-side bridge capacitor 354C between the intermediate bridge node 350 and a third AC-side bridge connection node 356C. The first, second, and third AC-side bridge resistors 352A, 352B, 352C have a resistance ($R_r$). The first, second, and third AC-side bridge capacitors 354A, 354B, 354C have a capacitance ($C_r$). The first, second, and third AC-side bridge capacitors 354A, 354B, 354C are each connected to one phase of the inverter 314 output port 318 to provide a common mode connection point for the Wheatstone impedance bridge 340' on the AC side of the inverter 314. The first, second, and third AC-side bridge resistors 352A, 352B, 352C are included in the Wheatstone impedance bridge 340' to dampen potential resonance between the AC-side bridge capacitors 354A, 354B, 354C and the bridge inductor 348.

The impedance balancing noise filtering circuit 302 further includes a set of DC common mode filter capacitors 358 that are electrically intermediate the input port 316 of the inverter 314 and ground 360. The set of DC common mode filter capacitors 358 includes a first DC common mode filter capacitor 358A electrically intermediate the positive input terminal 320 of the inverter 314 and ground 360 and a second DC common mode filter capacitor 358B electrically intermediate the negative input terminal 322 of the inverter 314 and ground 360. Each capacitor of the set of DC common mode filter capacitors 358 has a capacitance ($C_{cmdc}$).

A set of DC-side choke inductors 362 is electrically intermediate the output port 306 of the DC power source 304 and the input port 316 of the inverter 314. The set of DC-side choke inductors 362 includes a first DC-side choke inductor 362A that is electrically intermediate the positive output terminal 308 of the DC power source 304 and the positive input terminal 320 of the inverter 314 and a second DC-side choke inductor 362B that is electrically intermediate the negative output terminal 310 of the DC power source 304 and the negative input terminal 322 of the inverter 314. Note that the set of DC-side choke inductors 362 may be configured such that both positive and negative lines are wound around the same magnetic core. Each inductor of the set of DC-side choke inductors 362 has an inductance ($L_{cm}$) that is selected in coordination with the inductance of the bridge inductor 348 to balance impedance across the Wheatstone impedance bridge 340'.

The set of DC-side choke inductors 362 are configured to reduce the DC-side common mode current. Furthermore, the low-impedance parallel set of DC common mode filter capacitors 358 are configured to further enhance the attenuation of the common mode current. In other words, the set of DC-side choke inductors 362 and the set of DC common mode filter capacitors 358 collectively form a DC-side common mode filter to filter EMI at the DC output port 306.

A DC-link capacitor 364 is electrically intermediate the positive input terminal 320 and the negative input terminal 322 of the inverter 314. The DC-link capacitor 364 has a capacitance ($C_{dc}$) that is selected to minimize effects of interconnect inductance on switching operations of the inverter 314. The capacitance of the DC-link capacitor 364 may be suitably large enough that the DC-link capacitor 364 can be considered as a short circuit for common mode EMI modeling.

The impedance balancing noise filtering circuit 302 further includes a set of AC-side choke inductors 366 that is electrically intermediate the output port 318 of the inverter 314 and the input port 330 of the AC load 332. The set of AC-side choke inductors 366 includes a first AC-side choke inductor 366A that is electrically intermediate the first output terminal 324 of the inverter 314 and the first AC-side bridge connection node 356A, a second AC-side choke inductor 366B that is electrically intermediate the second output terminal 326 of the inverter 314 and the second AC-side bridge connection node 356B, and a third AC-side choke inductor 366C that is electrically intermediate the third output terminal 328 of the inverter 314 and the third AC-side bridge connection node 356C. Each inductor of the set of AC-side choke inductors 366 has an inductance ($L_{cmac}$).

The impedance balancing noise filtering circuit 302 further includes a set of AC common mode filter capacitors 368 that is electrically intermediate the input port 330 of the AC load 332 and ground 360 and electrically intermediate the set of AC-side choke inductors 366 and ground 360. The set of AC common mode filter capacitors 368 includes a first AC common mode filter capacitor 368A that is electrically intermediate the first AC-side bridge connection node 356A and ground 360, a second AC common mode filter capacitor 368B that is electrically intermediate the second AC-side bridge connection node 356B and ground 360, and a third AC common mode filter capacitor 368C that is electrically intermediate the third AC-side bridge connection node 356C and ground 360. Each capacitor of the set of AC common mode filter capacitors 368 has a capacitance ($C_{cmac}$).

The set of AC-side choke inductors 366 are configured to reduce the AC-side common mode current. Furthermore, the low-impedance parallel set of AC-side common mode filter capacitors 368 are configured to further enhance the attenuation of the common mode current. In other words, the set of AC-side choke inductors 366 and the set of AC common mode filter capacitors 368 collectively form an AC-side common mode filter configured to filter EMI at the input port 330 of the AC load 332.

Based on the properties of the Wheatstone impedance bridge 340', the common mode current (e.g., as measurable by the LISN 312 at the output port 306 of the DC power source 304) is zero if a ratio of an inductance of the bridge inductor 348 of the Wheatstone impedance bridge 340' and an inductance of the set of DC-side choke inductors 362 is equal to a ratio of a capacitance of the set of AC common mode filter capacitors 368 and a capacitance of the set of DC common mode filter capacitors 358 for an EMI frequency range (e.g., 150 kHz to ~2 MHz). That is, the common mode current for the electric drive system 300 is zero if:

$$\frac{L_r}{L_{cmdc}} = \frac{C_{cmac}}{C_{cmdc}}$$

In the EMI frequency range, the impedance of each of the AC-side bridge resistors 352 that corresponds to the selected value for ($R_r$) and the impedance of each of the AC-side bridge capacitors 354 that corresponds to the selected value for ($C_r$) is much smaller than the impedance of the bridge inductor 348 that corresponds to the selected value for ($L_r$). Furthermore, the impedance of each of the DC-side bridge capacitors 342 that correspond to the selected value for ($C_x$) is much smaller than the impedance of the set of DC-side choke inductors 362 that corresponds to the selected value for ($L_{cm}$). In other words, the influence of these resistors and capacitors on the balancing of impedance is minimized relative to the inductors. Therefore, the effects of the insertion circuits on the impedance balance condition can be neglected, and the Wheatstone impedance bridge 340' can be balanced based on the above described relationship.

Figure 4:
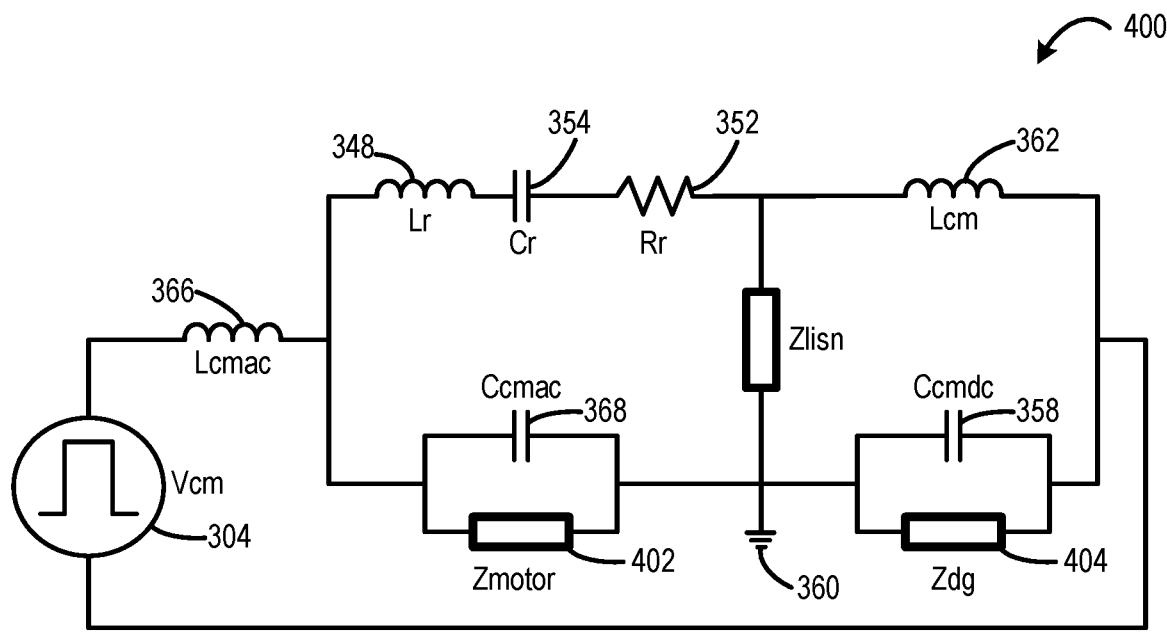
FIG. 4 schematically shows an equivalent representation of the impedance balancing noise filtering circuit of the electric drive system of FIG. 3

Additionally, the presence of the set of DC-side choke inductors 362 and the set of AC-side choke inductors 366 on both of the DC-side and the AC-side of the inverter 314 limits motor grounding current and allows for the capacitance of each of the capacitors of the sets of DC common mode filter capacitors and the sets of AC common mode filter capacitors to be significantly increased. FIG. 4 schematically shows an alternative equivalent representation of the electric drive system of FIG. 3. Components identified in FIG. 3 are labeled in the same manner in FIG. 4. The set of AC common mode filter capacitors 368 are in parallel with the motor impedance 402 and the set of DC common mode filter capacitors 358 are in parallel with the device parasitic impedance 404. For the motor branch, when the capacitance $C_{cmac}$ is very large, the impedance $Z_{Ccmac}$ is small compared to the motor impedance $Z_{motor}$, therefore:

$$Z_m = \frac{Z_{Ccmac} \cdot Z_{motor}}{Z_{Ccmac} + Z_{motor}} \approx \frac{Z_{Ccmac} \cdot Z_{motor}}{Z_{motor}} \approx Z_{Ccmac}$$

Furthermore, for the device branch, when the capacitance $C_{cmdc}$ is very large, the impedance $Z_{Ccmdc}$ is small compared to the device parasitic impedance $Z_{dg}$, therefore:

$$Z_d = \frac{Z_{Ccmdc} \cdot Z_{dg}}{Z_{Ccmdc} + Z_{dg}} \approx \frac{Z_{Ccmdc} \cdot Z_{dg}}{Z_{dg}} \approx Z_{Ccmdc}$$

In other words, the large capacitances of the sets of DC common mode filter capacitors 358 and the sets of AC common mode filter capacitors 368 minimize the influence of the impedance of the parasitic parameters of the motor model and device model. FIG. 3 is an example implementation of an electric drive system, but any other implementation that is substantially equivalent to the electric drive system of FIG. 4 is within the scope of this disclosure.

Figure 5:
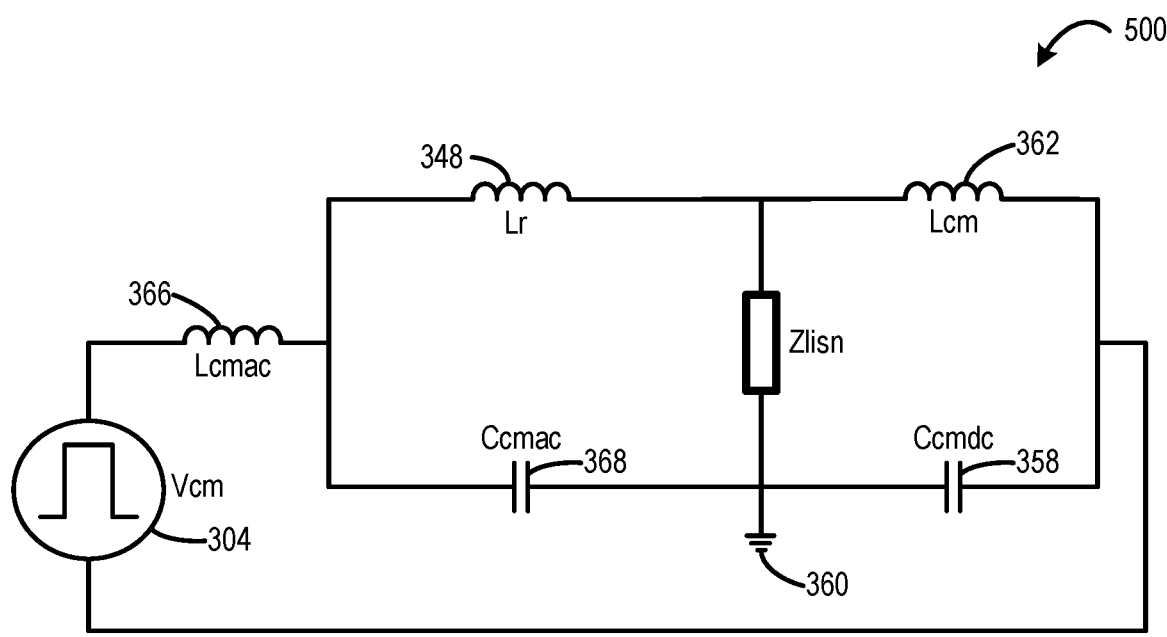
FIG. 5 schematically shows a simplified representation of the impedance balancing noise filtering circuit of FIG. 4.

FIG. 5 schematically shows a simplified representation of the electric drive system of FIG. 4. In particular, the motor and device impedances are removed due to the minimal influence of these impedances on the circuit as described above. Therefore, the motor branch in FIG. 5 can be simplified to $C_{cmac}$ and the device branch can be simplified to $C_{cmdc}$. Such a configuration facilitates impedance balancing and noise attenuation to be achieved based on the relationship:

$$\frac{L_r}{L_{cmdc}} = \frac{C_{cmac}}{C_{cmdc}}$$

Furthermore, the large capacitances of the sets of DC common mode filter capacitors 358 and the sets of AC common mode filter capacitors 368 allow for impedance balancing to be achieved over a wider EMI frequency range relative to an electric drive system without an impedance balancing noise filtering circuit. FIG. 3 is an example implementation of an electric drive system, but any other implementation that is substantially equivalent to the simplified representation of the electric drive system of FIG. 5 is within the scope of this disclosure.

Figure 6:
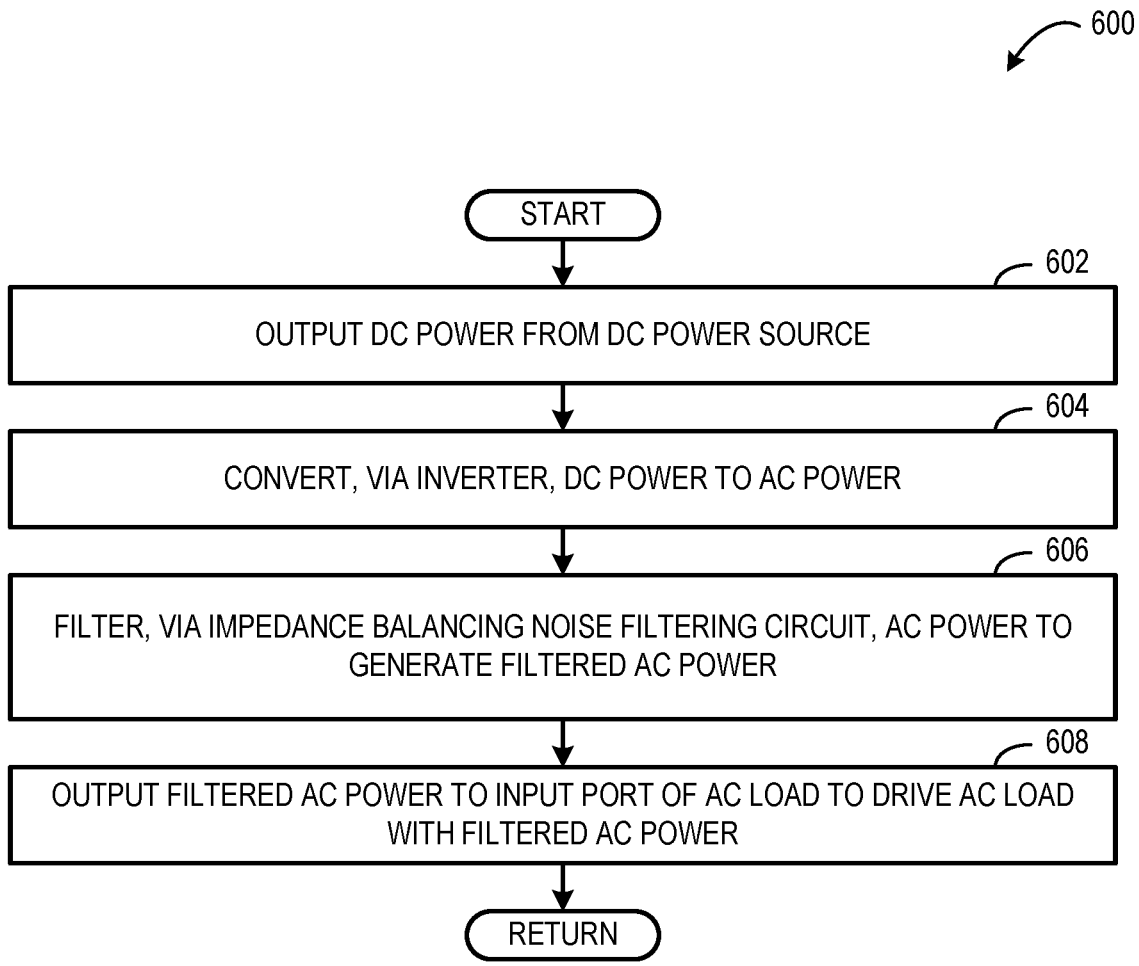
FIG. 6 is a flowchart of an example method for controlling an electric drive system including an impedance balancing noise filtering circuit.

FIG. 6 is a flowchart of an example embodiment of a method 600 for controlling an electric drive system to drive an AC load. For example, the method 600 may be performed to control operation of the electric drive system 300 shown in FIG. 3 or another suitable electric drive system including an impedance balancing noise filtering circuit. At 602, the method 600 includes outputting DC power from a DC power source. For example, the DC power source may include a DC bus, a battery, and/or another type of power source. In one example, the DC power may be output by the DC power source 304 of FIGS. 3-5. At 604, the method 600 includes converting, via an inverter, the DC power to AC power. In one example, the DC power may be converted to AC power by the inverter 314 of FIGS. 3-5. At 606, the method includes filtering, via an impedance balancing noise filtering circuit, the AC power to generate filtered AC power. In one example, the AC power may be filtered using any of the components of the impedance balancing noise filtering circuit 302 of FIGS. 3-5. For example, the AC power may be filtered by introducing a common mode balancing current through the output port of the DC power source. The common mode balancing current may have an amplitude substantially matching an amplitude of a common mode current generated by parasitic impedances at the output port of the DC power source. The common mode balancing current may have a polarity that is opposite of a polarity of the common mode current. The impedance bridge of the impedance balancing noise filtering circuit is configured such that a ratio of an inductance of the bridge inductor of the impedance bridge and an inductance of each of the set of DC-side choke inductors is equal to a ratio of a capacitance of the set of AC common mode filter capacitors and a capacitance of each of the set of DC common mode filter capacitors for an EMI frequency range. When this relationship holds true for the EMI frequency range a common mode current at the output port of the DC power source may be reduced or substantially zero.

Continuing with the method 600, at 608, the method 600 includes outputting the filtered AC power to the input port of the AC load to drive the AC load with the filtered AC power.

By employing the impedance balancing noise filtering circuit to filter the AC power and reduce common mode noise in place of conventional EMI filters, significant reductions in weight, volume, and power loss are realized for the electric drive system that, in turn, increases performance of the electric drive system in terms of specific power and efficiency.

The impedance balancing noise filtering concepts described herein may be broadly applicable to any suitable electric drive system that is configured to drive any suitable type of load. For aircraft applications, the impedance balancing noise filtering concepts may be implemented to reduce EMI emissions on both the DC-side and the AC-side of the inverter in order to comply with various requirements, such as EMI standard DO-160 or other EMI requirements that may apply depending upon the specific application.

A system, comprises a direct current (DC) power source configured to output DC power to an output port, an inverter including an input port and an output port, wherein the inverter is configured to convert DC power output by the DC power source into alternating current (AC) power provided to an input port of an AC load such that the AC load is driven by the AC power, and an impedance balancing noise filtering circuit. The impedance balancing noise filtering circuit includes a set of AC-side choke inductors electrically intermediate the output port of the inverter and the input port of the AC load, a set of AC common mode filter capacitors electrically intermediate the input port of the AC load and ground and electrically intermediate the AC-side choke inductor and ground, a set of DC common mode filter capacitors electrically intermediate the input port of the inverter and ground and electrically intermediate the output port of the DC power source and ground, and an impedance bridge electrically intermediate the output port of the DC power source and the input port of the AC load. In this example and/or other examples, the output port of the DC power source may include a positive output terminal and a negative output terminal, the impedance bridge may include a Wheatstone impedance bridge including a first DC-side bridge capacitor electrically intermediate the positive output terminal of the DC power source and a DC-side bridge connection node, a second DC-side bridge capacitor intermediate the negative output terminal of the DC power source and the DC-side bridge connection node, the first DC-side bridge capacitor, the DC-side bridge connection node, and the second DC-side bridge capacitor may be in series between the positive output terminal of the DC power source and the negative output terminal of the DC power source, and the Wheatstone impedance bridge may further include a bridge inductor electrically intermediate the DC-side bridge connection node and an intermediate bridge node, a first AC-side bridge resistor in series with a first AC-side bridge capacitor between the intermediate bridge node and a first AC-side bridge connection node, a second AC-side bridge resistor in series with a second AC-side bridge capacitor between the intermediate bridge node and a second AC-side bridge connection node, and a third AC-side bridge resistor in series with a third AC-side bridge capacitor between the intermediate bridge node and a third AC-side bridge connection node. In this example and/or other examples, the input port of the inverter may include a positive input terminal and a negative input terminal, the set of DC common mode filter capacitors may include a first DC common mode filter capacitor electrically intermediate the positive input terminal of the inverter and ground and a second DC common mode filter capacitor electrically intermediate the negative input terminal of the inverter and ground, and the impedance balancing noise filtering circuit may include a set of DC-side choke inductors including a first DC-side choke inductor electrically intermediate the positive output terminal of the DC power source and the positive input terminal of the inverter and a second DC-side choke inductor electrically intermediate the negative output terminal of the DC power source and the negative input terminal of the inverter. In this example and/or other examples, the output port of the inverter may include first, second, and third output terminals, the set of AC-side choke inductors may include a first AC-side choke inductor electrically intermediate the first output terminal of the inverter and the first AC-side bridge connection node, a second AC-side choke inductor electrically intermediate the second output terminal of the inverter and the second AC-side bridge connection node, and a third AC-side choke inductor electrically intermediate a third output terminal of the inverter and the third AC-side bridge connection node, and the set of AC common mode filter capacitors may include a first AC common mode filter capacitor electrically intermediate the first AC-side bridge connection node and ground, a second AC common mode filter capacitor electrically intermediate the second AC-side bridge connection node and ground, and a third AC common mode filter capacitor electrically intermediate the third AC-side bridge connection node and ground. In this example and/or other examples, a ratio of an inductance of the bridge inductor of the Wheatstone impedance bridge and an inductance of the set of DC-side choke inductors may be equal to a ratio of a capacitance of the set of AC common mode filter capacitors and a capacitance of the set of DC common mode filter capacitors for an electromagnetic interference frequency range. In this example and/or other examples, the impedance balancing noise filtering circuit may be configured to balance a common mode device parasitic impedance of the inverter and a common mode impedance of the AC load. In this example and/or other examples, the impedance balancing noise filtering circuit may be configured to introduce a common mode balancing current through the output port of the DC power source, the common mode balancing current may have an amplitude substantially matching an amplitude of a common mode current generated by parasitic impedances at the output port of the DC power source, and the common mode balancing current may have an opposite polarity of the common mode current generated by parasitic impedances at the output port of the DC power source. In this example and/or other examples, the AC load may include an AC motor. In this example and/or other examples, the AC load may further include a power cable intermediate the AC motor and the input port of the AC load. In this example and/or other examples, the inverter and the impedance balancing noise filtering circuit may be contained in a common enclosure, the AC motor may be located outside the common enclosure, the impedance balancing noise filtering circuit may be configured to filter AC power output by the inverter to generate filtered AC power having reduced electromagnetic interference noise measured at the output port of the DC power source, and the power cable may be configured to deliver the filtered AC power out of the common enclosure to the AC motor. In this example and/or other examples, the AC motor may be located in an aircraft wing, and the common enclosure may be located in an aircraft fuselage.

In another example, a method for controlling an electric drive system to drive an AC load comprises outputting direct current (DC) power from a DC power source, converting, via an inverter, the DC power to alternating current (AC) power, filtering, via an impedance balancing noise filtering circuit, the AC power to generate filtered AC power, the impedance balancing noise filtering circuit includes a set of AC-side choke inductors electrically intermediate an output port of the inverter and an input port of the AC load, a set of AC common mode filter capacitors electrically intermediate the input port of the AC load and ground and electrically intermediate the set of AC-side choke inductors and ground, a set of DC common mode filter capacitors electrically intermediate an input port of the inverter and ground and electrically intermediate the output port of the DC power source and ground, and an impedance bridge electrically intermediate the output port of the DC power source and the input port of the AC load, and outputting the filtered AC power to the input port of the AC load to drive the AC load with the filtered AC power. In this example and/or other examples, the impedance balancing noise filtering circuit may be configured to filter the AC power by introducing a common mode balancing current through the output port of the DC power source, and the common mode balancing current may have an amplitude substantially matching an amplitude and with an opposite polarity of a common mode current generated by parasitic impedances at the output port of the DC power source. In this example and/or other examples, the impedance bridge may include a Wheatstone impedance bridge, and a ratio of an inductance of a bridge inductor of the Wheatstone impedance bridge and an inductance of a set of DC-side choke inductors may be equal to a ratio of a capacitance of the set of AC common mode filter capacitors and a capacitance of the set of DC common mode filter capacitors for an electromagnetic interference frequency range.

In another example, an aircraft, comprises a fuselage, a wing extending from the fuselage, a direct current (DC) power source positioned in the fuselage and configured to output DC power to an output port, an inverter positioned in the fuselage and configured to convert DC power output by the DC power source into alternating current (AC) power, an impedance balancing noise filtering circuit positioned in the fuselage and configured to filter the AC power to generate filtered AC power having reduced electromagnetic interference noise measured at the output port of the DC power source and output the filtered AC power to an output port, an AC motor positioned in the wing and including an input port, and a power cable electrically intermediate the output port of the impedance balancing noise filtering circuit in the fuselage and the input port of the AC motor in the wing. In this example and/or other examples, the impedance balancing noise filtering circuit may comprise a set of AC-side choke inductors electrically intermediate an output port of the inverter and the output port of the impedance balancing noise filtering circuit, a set of AC common mode filter capacitors electrically intermediate the output port of the impedance balancing noise filtering circuit and ground and intermediate the set of AC-side choke inductors and ground, a set of DC common mode filter capacitors electrically intermediate an input port of the inverter and ground and intermediate the output port of the DC power source and ground, and an impedance bridge electrically intermediate the output port of the DC power source and the output port of the impedance balancing noise filtering circuit. In this example and/or other examples, the output port of the DC power source may include a positive output terminal and a negative output terminal, the impedance bridge may include a Wheatstone impedance bridge including a first DC-side bridge capacitor electrically intermediate the positive output terminal of the DC power source and a DC-side bridge connection node, a second DC-side bridge capacitor intermediate the negative output terminal of the DC power source and the DC-side bridge connection node, the first DC-side bridge capacitor, the DC-side bridge connection node, and the second DC-side bridge capacitor may be in series between the positive output terminal of the DC power source and the negative output terminal of the DC power source, and the Wheatstone impedance bridge may further include a bridge inductor electrically intermediate the DC-side bridge connection node and an intermediate bridge node, a first AC-side bridge resistor in series with a first AC-side bridge capacitor between the intermediate bridge node and a first AC-side bridge connection node, a second AC-side bridge resistor in series with a second AC-side bridge capacitor between the intermediate bridge node and a second AC-side bridge connection node, and a third AC-side bridge resistor in series with a third AC-side bridge capacitor between the intermediate bridge node and a third AC-side bridge connection node. In this example and/or other examples, the input port of the inverter may include a positive input terminal and a negative input terminal, the set of DC common mode filter capacitors may include a first DC common mode filter capacitor electrically intermediate the positive input terminal of the inverter and ground and a second DC common mode filter capacitor electrically intermediate the negative input terminal of the inverter and ground, and the impedance balancing noise filtering circuit may include a set of DC-side choke inductors including a first DC-side choke inductor electrically intermediate the positive output terminal of the DC power source and the positive input terminal of the inverter and a second DC-side choke inductor electrically intermediate the negative output terminal of the DC power source and the negative input terminal of the inverter. In this example and/or other examples, the output port of the inverter may include first, second, and third output terminals, the set of AC-side choke inductors may include a first AC-side choke inductor electrically intermediate the first output terminal of the inverter and the first AC-side bridge connection node, a second AC-side choke inductor electrically intermediate the second output terminal of the inverter and the second AC-side bridge connection node, and a third AC-side choke inductor electrically intermediate a third output terminal of the inverter and the third AC-side bridge connection node, and wherein the set of AC common mode filter capacitors includes a first AC common mode filter capacitor electrically intermediate the first AC-side bridge connection node and ground, a second AC common mode filter capacitor electrically intermediate the second AC-side bridge connection node and ground, and a third AC common mode filter capacitor electrically intermediate the third AC-side bridge connection node and ground. In this example and/or other examples, a ratio of an inductance of a bridge inductor of the impedance bridge and an inductance of a set of DC-side choke inductors may be equal to a ratio of a capacitance of the set of AC common mode filter capacitors and a capacitance of the set of DC common mode filter capacitors for an electromagnetic interference frequency range.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A system, comprising:
    a direct current (DC) power source configured to output DC power to an output port;
    an inverter including an input port and an output port, wherein the inverter is configured to convert DC power output by the DC power source into alternating current (AC) power provided to an input port of an AC load such that the AC load is driven by the AC power; and
    an impedance balancing noise filtering circuit including:
        a set of AC-side choke inductors electrically intermediate the output port of the inverter and the input port of the AC load;
        a set of AC common mode filter capacitors electrically intermediate the input port of the AC load and ground and electrically intermediate the AC-side choke inductor and ground;
        a set of DC common mode filter capacitors electrically intermediate the input port of the inverter and ground and electrically intermediate the output port of the DC power source and ground; and
        an impedance bridge electrically intermediate the output port of the DC power source and the input port of the AC load.

2. The system of claim 1, wherein the output port of the DC power source includes a positive output terminal and a negative output terminal, wherein the impedance bridge includes a Wheatstone impedance bridge including a first DC-side bridge capacitor electrically intermediate the positive output terminal of the DC power source and a DC-side bridge connection node, a second DC-side bridge capacitor intermediate the negative output terminal of the DC power source and the DC-side bridge connection node, wherein the first DC-side bridge capacitor, the DC-side bridge connection node, and the second DC-side bridge capacitor are in series between the positive output terminal of the DC power source and the negative output terminal of the DC power source, and wherein the Wheatstone impedance bridge further includes a bridge inductor electrically intermediate the DC-side bridge connection node and an intermediate bridge node, a first AC-side bridge resistor in series with a first AC-side bridge capacitor between the intermediate bridge node and a first AC-side bridge connection node, a second AC-side bridge resistor in series with a second AC-side bridge capacitor between the intermediate bridge node and a second AC-side bridge connection node, and a third AC-side bridge resistor in series with a third AC-side bridge capacitor between the intermediate bridge node and a third AC-side bridge connection node.

3. The system of claim 2, wherein the input port of the inverter includes a positive input terminal and a negative input terminal, wherein the set of DC common mode filter capacitors includes a first DC common mode filter capacitor electrically intermediate the positive input terminal of the inverter and ground and a second DC common mode filter capacitor electrically intermediate the negative input terminal of the inverter and ground, and wherein the impedance balancing noise filtering circuit includes a set of DC-side choke inductors including a first DC-side choke inductor electrically intermediate the positive output terminal of the DC power source and the positive input terminal of the inverter and a second DC-side choke inductor electrically intermediate the negative output terminal of the DC power source and the negative input terminal of the inverter.

4. The system of claim 3, wherein the output port of the inverter includes first, second, and third output terminals, wherein the set of AC-side choke inductors includes a first AC-side choke inductor electrically intermediate the first output terminal of the inverter and the first AC-side bridge connection node, a second AC-side choke inductor electrically intermediate the second output terminal of the inverter and the second AC-side bridge connection node, and a third AC-side choke inductor electrically intermediate a third output terminal of the inverter and the third AC-side bridge connection node, and wherein the set of AC common mode filter capacitors includes a first AC common mode filter capacitor electrically intermediate the first AC-side bridge connection node and ground, a second AC common mode filter capacitor electrically intermediate the second AC-side bridge connection node and ground, and a third AC common mode filter capacitor electrically intermediate the third AC-side bridge connection node and ground.

5. The system of claim 4, wherein a ratio of an inductance of the bridge inductor of the Wheatstone impedance bridge and an inductance of the set of DC-side choke inductors is equal to a ratio of a capacitance of the set of AC common mode filter capacitors and a capacitance of the set of DC common mode filter capacitors for an electromagnetic interference frequency range.

6. The system of claim 1, wherein the impedance balancing noise filtering circuit is configured to balance a common mode device parasitic impedance of the inverter and a common mode impedance of the AC load.

7. The system of claim 1, wherein the impedance balancing noise filtering circuit is configured to introduce a common mode balancing current through the output port of the DC power source, wherein the common mode balancing current has an amplitude substantially matching an amplitude of a common mode current generated by parasitic impedances at the output port of the DC power source, and wherein the common mode balancing current has an opposite polarity of the common mode current generated by parasitic impedances at the output port of the DC power source.

8. The system of claim 1, wherein the AC load includes an AC motor.

9. The system of claim 8, wherein the AC load further includes a power cable intermediate the AC motor and the input port of the AC load.

10. The system of claim 9, wherein the inverter and the impedance balancing noise filtering circuit are contained in a common enclosure, wherein the AC motor is located outside the common enclosure, wherein the impedance balancing noise filtering circuit is configured to filter AC power output by the inverter to generate filtered AC power having reduced electromagnetic interference noise measured at the output port of the DC power source, and wherein the power cable is configured to deliver the filtered AC power out of the common enclosure to the AC motor.

11. The system of claim 10, wherein the AC motor is located in an aircraft wing, and wherein the common enclosure is located in an aircraft fuselage.

12. A method for controlling an electric drive system to drive an AC load, the method comprising:
outputting direct current (DC) power from a DC power source;
converting, via an inverter, the DC power to alternating current (AC) power;
filtering, via an impedance balancing noise filtering circuit, the AC power to generate filtered AC power, wherein the impedance balancing noise filtering circuit includes a set of AC-side choke inductors electrically intermediate an output port of the inverter and an input port of the AC load, a set of AC common mode filter capacitors electrically intermediate the input port of the AC load and ground and electrically intermediate the set of AC-side choke inductors and ground, a set of DC common mode filter capacitors electrically intermediate an input port of the inverter and ground and electrically intermediate the output port of the DC power source and ground, and an impedance bridge electrically intermediate the output port of the DC power source and the input port of the AC load; and
outputting the filtered AC power to the input port of the AC load to drive the AC load with the filtered AC power.

13. The method of claim 12, wherein the impedance balancing noise filtering circuit is configured to filter the AC power by introducing a common mode balancing current through the output port of the DC power source, and wherein the common mode balancing current has an amplitude substantially matching an amplitude and with an opposite polarity of a common mode current generated by parasitic impedances at the output port of the DC power source.

14. The method of claim 12, wherein the impedance bridge includes a Wheatstone impedance bridge, and wherein a ratio of an inductance of a bridge inductor of the Wheatstone impedance bridge and an inductance of a set of DC-side choke inductors is equal to a ratio of a capacitance of the set of AC common mode filter capacitors and a capacitance of the set of DC common mode filter capacitors for an electromagnetic interference frequency range.

15. An aircraft, comprising:
a fuselage;
a wing extending from the fuselage;
a direct current (DC) power source positioned in the fuselage and configured to output DC power to an output port;
an inverter positioned in the fuselage and configured to convert DC power output by the DC power source into alternating current (AC) power;
an impedance balancing noise filtering circuit positioned in the fuselage and configured to filter the AC power to generate filtered AC power having reduced electromagnetic interference noise measured at the output port of the DC power source and output the filtered AC power to an output port;
an AC motor positioned in the wing and including an input port; and
a power cable electrically intermediate the output port of the impedance balancing noise filtering circuit in the fuselage and the input port of the AC motor in the wing.

16. The aircraft of claim 15, wherein the impedance balancing noise filtering circuit comprises:
a set of AC-side choke inductors electrically intermediate an output port of the inverter and the output port of the impedance balancing noise filtering circuit;
a set of AC common mode filter capacitors electrically intermediate the output port of the impedance balancing noise filtering circuit and ground and intermediate the set of AC-side choke inductors and ground;
a set of DC common mode filter capacitors electrically intermediate an input port of the inverter and ground and intermediate the output port of the DC power source and ground; and
an impedance bridge electrically intermediate the output port of the DC power source and the output port of the impedance balancing noise filtering circuit.

17. The aircraft of claim 16, wherein the output port of the DC power source includes a positive output terminal and a negative output terminal, wherein the impedance bridge includes a Wheatstone impedance bridge including a first DC-side bridge capacitor electrically intermediate the positive output terminal of the DC power source and a DC-side bridge connection node, a second DC-side bridge capacitor intermediate the negative output terminal of the DC power source and the DC-side bridge connection node, wherein the first DC-side bridge capacitor, the DC-side bridge connection node, and the second DC-side bridge capacitor are in series between the positive output terminal of the DC power source and the negative output terminal of the DC power source, and wherein the Wheatstone impedance bridge further includes a bridge inductor electrically intermediate the DC-side bridge connection node and an intermediate bridge node, a first AC-side bridge resistor in series with a first AC-side bridge capacitor between the intermediate bridge node and a first AC-side bridge connection node, a second AC-side bridge resistor in series with a second AC-side bridge capacitor between the intermediate bridge node and a second AC-side bridge connection node, and a third AC-side bridge resistor in series with a third AC-side bridge capacitor between the intermediate bridge node and a third AC-side bridge connection node.

18. The aircraft of claim 17, wherein the input port of the inverter includes a positive input terminal and a negative input terminal, wherein the set of DC common mode filter capacitors includes a first DC common mode filter capacitor electrically intermediate the positive input terminal of the inverter and ground and a second DC common mode filter capacitor electrically intermediate the negative input terminal of the inverter and ground, and wherein the impedance balancing noise filtering circuit includes a set of DC-side choke inductors including a first DC-side choke inductor electrically intermediate the positive output terminal of the DC power source and the positive input terminal of the inverter and a second DC-side choke inductor electrically intermediate the negative output terminal of the DC power source and the negative input terminal of the inverter.

19. The aircraft of claim 18, wherein the output port of the inverter includes first, second, and third output terminals, wherein the set of AC-side choke inductors includes a first AC-side choke inductor electrically intermediate the first output terminal of the inverter and the first AC-side bridge connection node, a second AC-side choke inductor electrically intermediate the second output terminal of the inverter and the second AC-side bridge connection node, and a third AC-side choke inductor electrically intermediate a third output terminal of the inverter and the third AC-side bridge connection node, and wherein the set of AC common mode filter capacitors includes a first AC common mode filter capacitor electrically intermediate the first AC-side bridge connection node and ground, a second AC common mode filter capacitor electrically intermediate the second AC-side bridge connection node and ground, and a third AC common mode filter capacitor electrically intermediate the third AC-side bridge connection node and ground.

20. The aircraft of claim 16, wherein a ratio of an inductance of a bridge inductor of the impedance bridge and an inductance of a set of DC-side choke inductors is equal to a ratio of a capacitance of the set of AC common mode filter capacitors and a capacitance of the set of DC common mode filter capacitors for an electromagnetic interference frequency range.

* * * * *